Feb. 5, 1963 H. R. DE VLIEG 3,076,388
MILLING MACHINE
Filed May 13, 1959 10 Sheets-Sheet 1

FIG. 1

INVENTOR.
HOWARD R. DEVLIEG
BY
William Frederick Werner
ATTORNEY

FIG. 6

INVENTOR.
HOWARD R. DEVLIEG
BY
*William Frederick Werner*
ATTORNEY

INVENTOR.
HOWARD R. DeVLIEG
BY
William Frederick Werner
ATTORNEY

Feb. 5, 1963 H. R. DE VLIEG 3,076,388
MILLING MACHINE

Filed May 13, 1959 10 Sheets-Sheet 8

FIG. 9

INVENTOR.
HOWARD R. DeVLIEG
BY
William Frederick Werner
ATTORNEY

Feb. 5, 1963  H. R. DE VLIEG  3,076,388
MILLING MACHINE

Filed May 13, 1959  10 Sheets-Sheet 9

INVENTOR.
HOWARD R. DeVLIEG
BY
*William Frederick Werner*
ATTORNEY

U̲n̲i̲t̲e̲d̲ S̲t̲a̲t̲e̲s̲ P̲a̲t̲e̲n̲t̲ O̲f̲f̲i̲c̲e̲

3,076,388
Patented Feb. 5, 1963

3,076,388
MILLING MACHINE
Howard R. De Vlieg, 123 Waterman St.,
Providence 6, R.I.
Filed May 13, 1959, Ser. No. 812,836
9 Claims. (Cl. 90—11)

This invention relates to milling machines and more particularly to contour pattern control of a work carrying spindle.

One of the objects of the present invention is to provide a milling machine with a work carrying spindle which generates a pattern in relation to a fixed position rotating cutter. The pattern is generated by oscillating the work carrying spindle simultaneously with both longitudinal and lateral movements of the work carrying spindle.

Another object of the present invention is to provide a milling machine with cam generated contour pattern control comprising the motions of raising and lowering a rotating cutter in timed relation with an oscillating work carrying spindle which moves both longitudinally and laterally in a predetermined timed cycle.

Another object of the present invention is to provide a milling machine with a cutting spindle movable toward and away from a work piece supported upon a work carrying spindle, which moves the work piece in indexed increments to repeat a contour pattern generated by three independent but coordinated movements of the work carrying spindle.

Another object of the present invention is to provide a milling machine with simplified cutting means whereby complex cuts requiring multiple movements are made through a single spindle under control of a plurality of cams.

Still another object of the present invention is to provide a milling machine with a construction to produce a higher degree of cutting accuracy, a higher degree of tool life and a wider range of contour variations in a work piece than was heretofore possible.

Another object of the present invention is to provide a milling machine for the profile cutting of a repetitive design in a work piece fabricated of high temperature alloy steels which require great accuracy in the profile of each repetitive design.

A further object of the present invention is to eliminate tool deflection, cutting chatter, excessive radial tool pressure, to prevent the cutting tool from dwelling in a cut and to eliminate chip accumulation.

And still a further object of the present invention is to eliminate distortion between the parts of a milling machine which have relative movement while firmly supporting and properly balancing a work piece in profile movement.

And still another object of the present invention is to eliminate the tracer in profile milling and consequently the inherent hunting of the tracer for the pattern.

The present invention consists of a rotating cutter spindle angularly adjustable in relation to a work piece with cam control means for moving the rotating cutter spindle toward and away from the work piece. And a work supporting spindle having indexing means to allow patterns of a repetitive nature to be cut in the work piece. The work carrying spindle has three coordinated movements consisting of oscillation, longitudinal and lateral movements which form a generated pattern.

Other objects of the present invention will be pointed out in part and become apparent in part in the following specification and claims.

Referring to the drawings in which similar characters of reference indicate corresponding parts in all the figures.

The milling machine illustrated in the drawings consists of a frame, generally indicated by reference numeral 9, provided with a bottom 11, a left side 12, a right side 13, a top 14 and a front side 15 having an opening 16. The rear side is unwalled. A cylinder 19 provided with internal threads forms an integral part of top 14. Two horizontal guide bars 17, 18 in vertical alignment are secured on opposite ends in left side 12 and right side 13, respectively. A saddle, generally indicated by reference character 10, is provided, consisting of a base 20, a left side wall 21, a right side wall 22, a rear wall 23 and a front wall 24 having an opening 25. Left side wall 21 and right side wall 22 are slidably mounted upon guide bars 17 and 18. Two horizontal shaft 26, 27 in horizontal alignment are secured on opposite ends in rear wall 23 and in front wall 24, respectively.

A spindle housing 30 is provided with two parallel aligned oppositely disposed sets of bearings 31, 32, and 33, 34 which are slidably mounted upon shafts 27 and 26 respectively. It will be noted that spindle housing 30 slides back and forth, longitudinally, upon shafts 26, 27 while the saddle 10 slides laterally or transversely to spindle housing 30 upon guide bars 17, 18. Thus spindle housing 30 in relation to frame 9 moves in two directions longitudinally and laterally.

Figure 1:
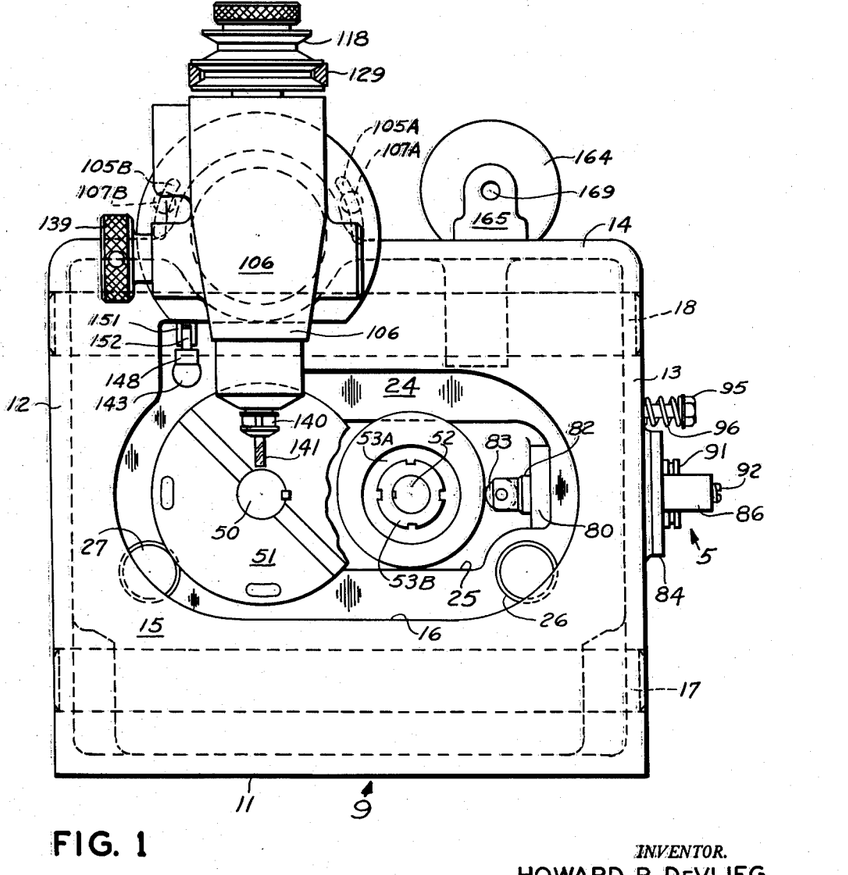
FIGURE 1 is a front elevational view of the new and improved milling machine.
Figure 2:
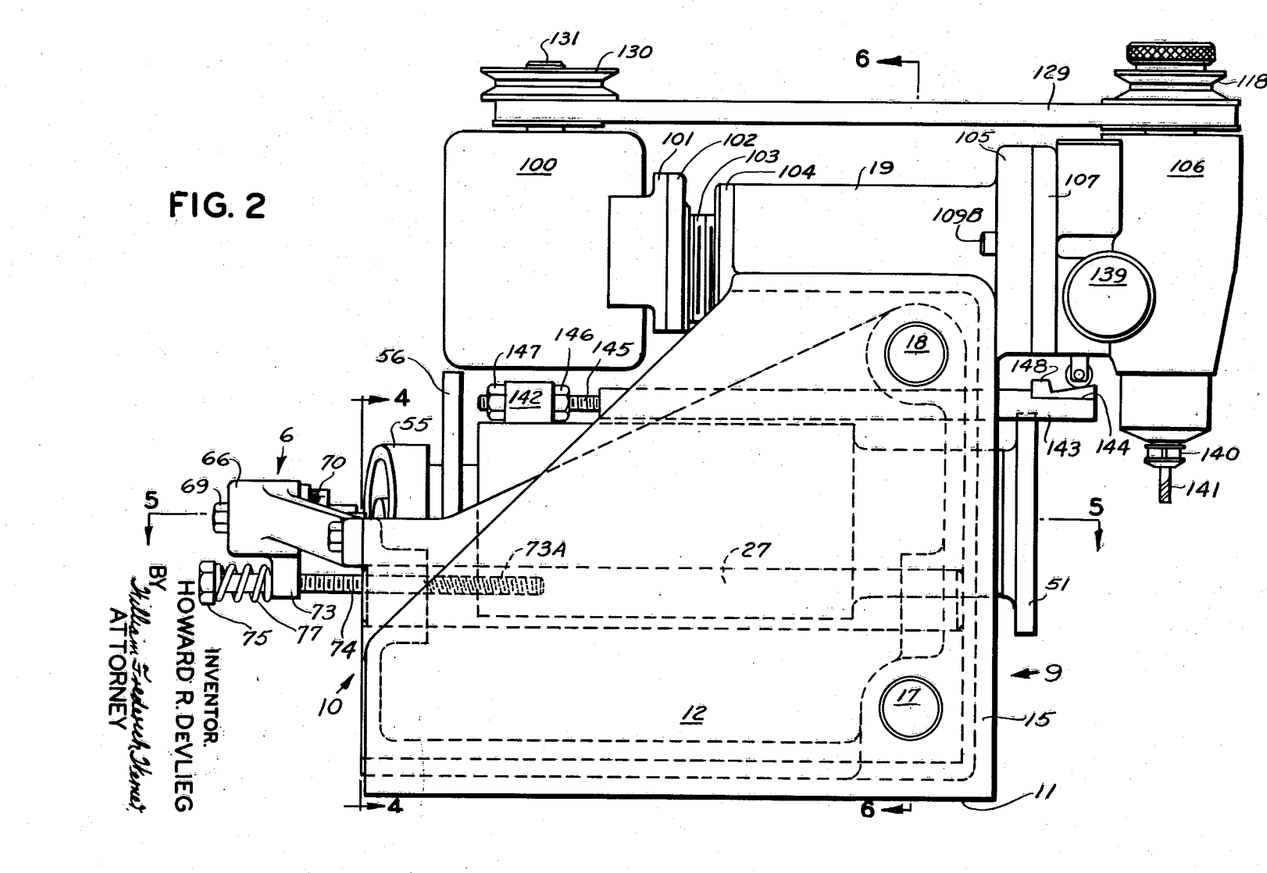
FIGURE 2 is a left side elevational view of FIGURE 1.
Figure 3:
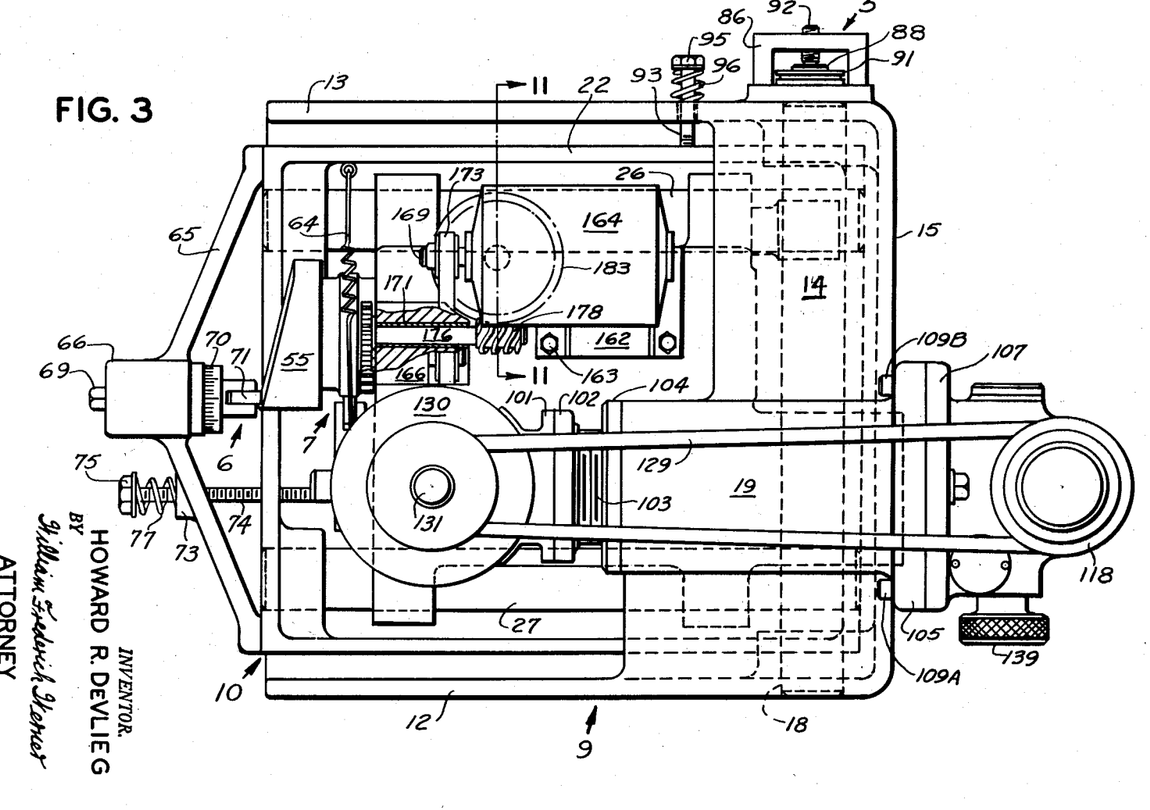
FIGURE 3 is a plan view of FIGURE 2.
Figure 4:
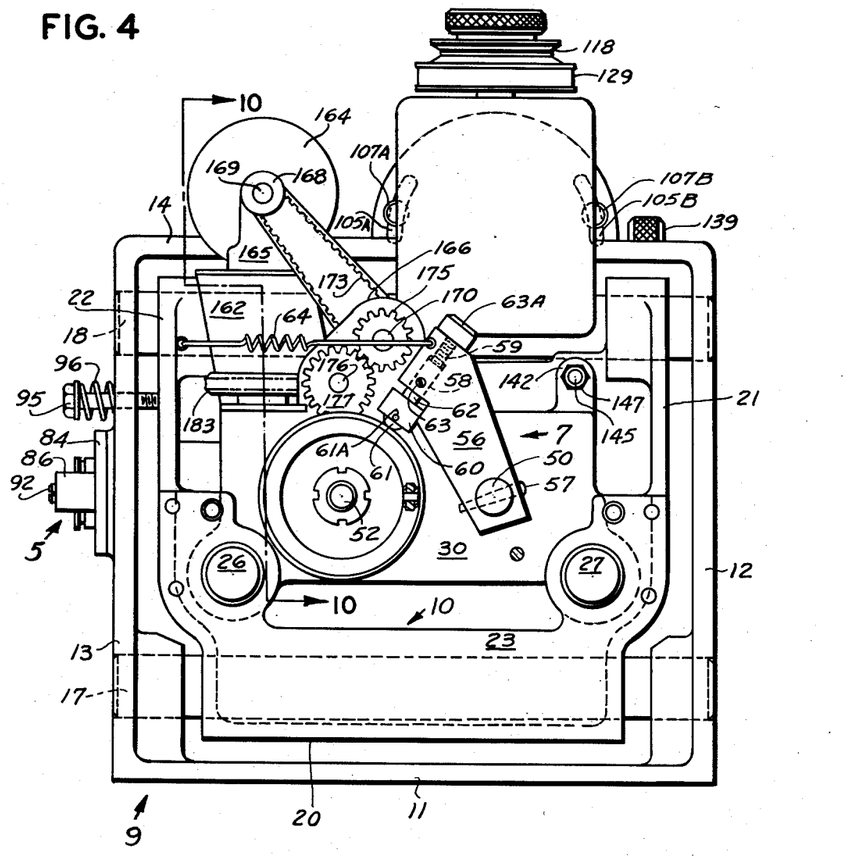
FIGURE 4 is a rear elevational view of the new and improved milling machine with a bracket removed.
Figure 5:
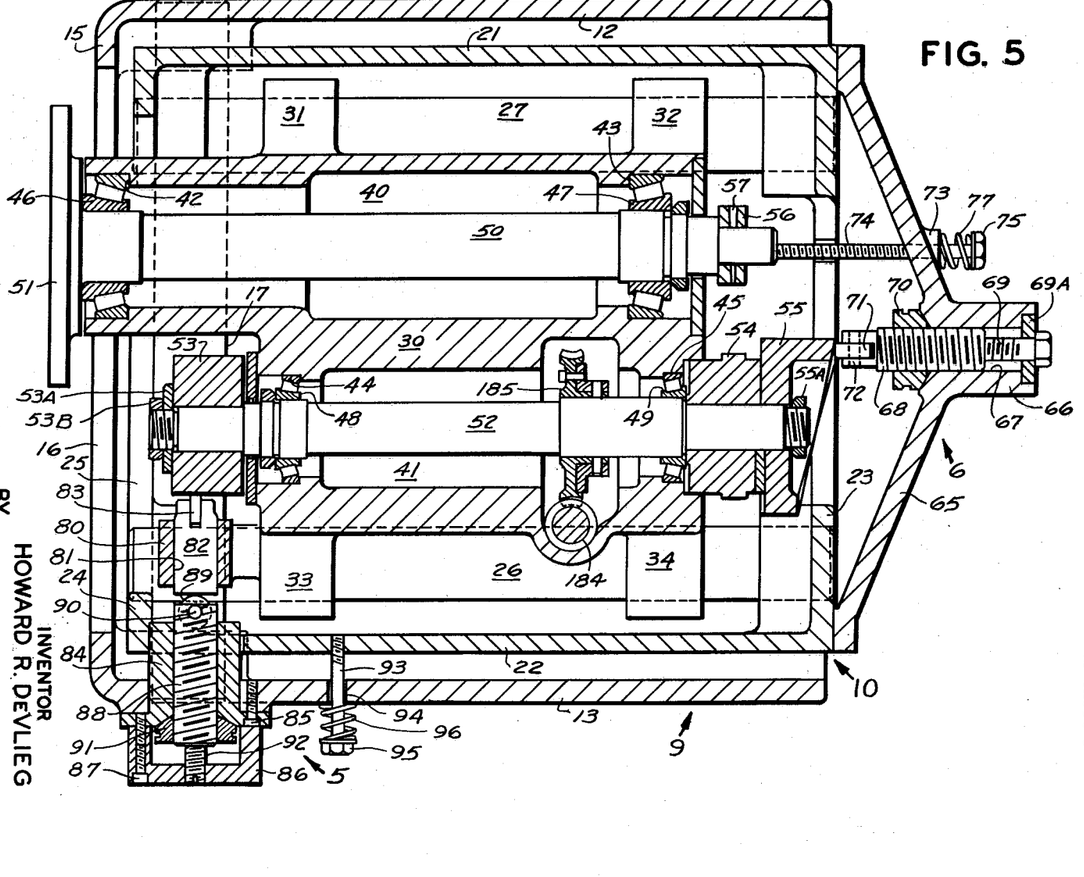
FIGURE 5 is a horizontal cross sectional view taken along line 5—5 of FIGURE 2.
Figure 6:
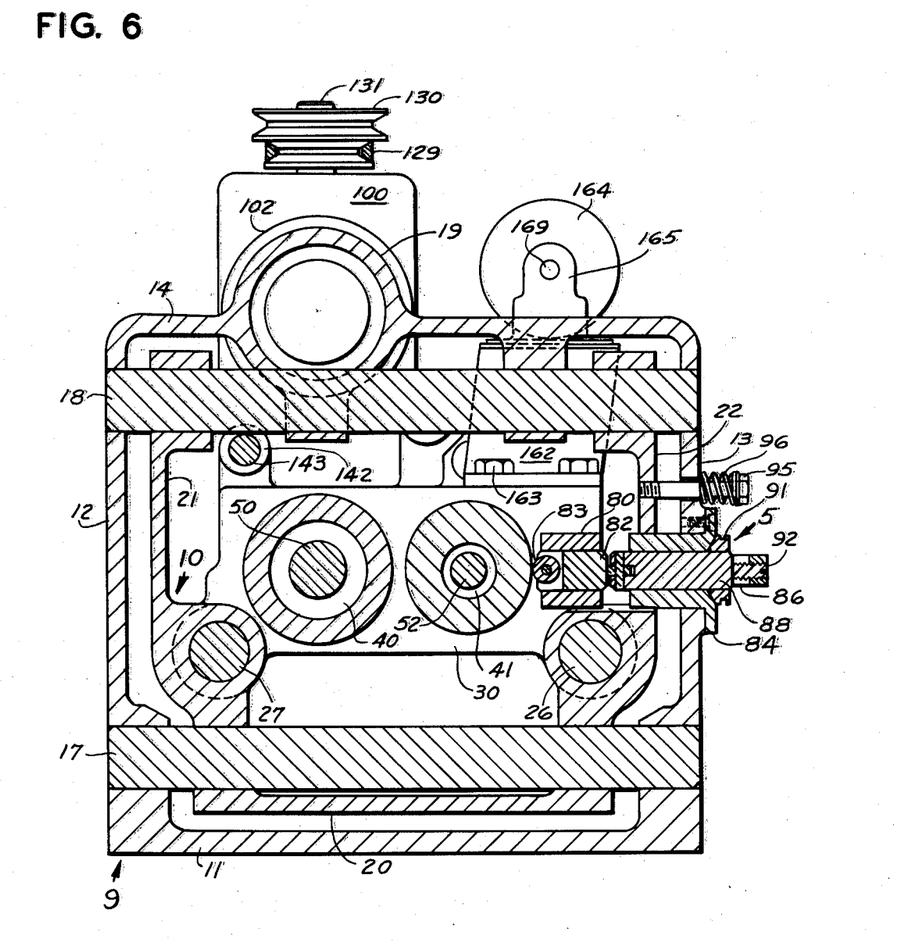
FIGURE 6 is a vertical cross sectional view taken along line 6—6 of FIGURE 2.

Spindle housing 30 is provided with two parallel stepped bores 40, 41 (see FIGURE 5) which run the full length of the spindle housing. Bearing seats 42, 43 are provided in bore 40. Bearing seats 44, 45 are provided in bore 41. Anti-friction bearings 46, 47 are secured in bearing seats 42, 43 respectively. Anti-friction bearings 48, 49 are secured in bearing seats 44, 45 respectively.

Figure 9:
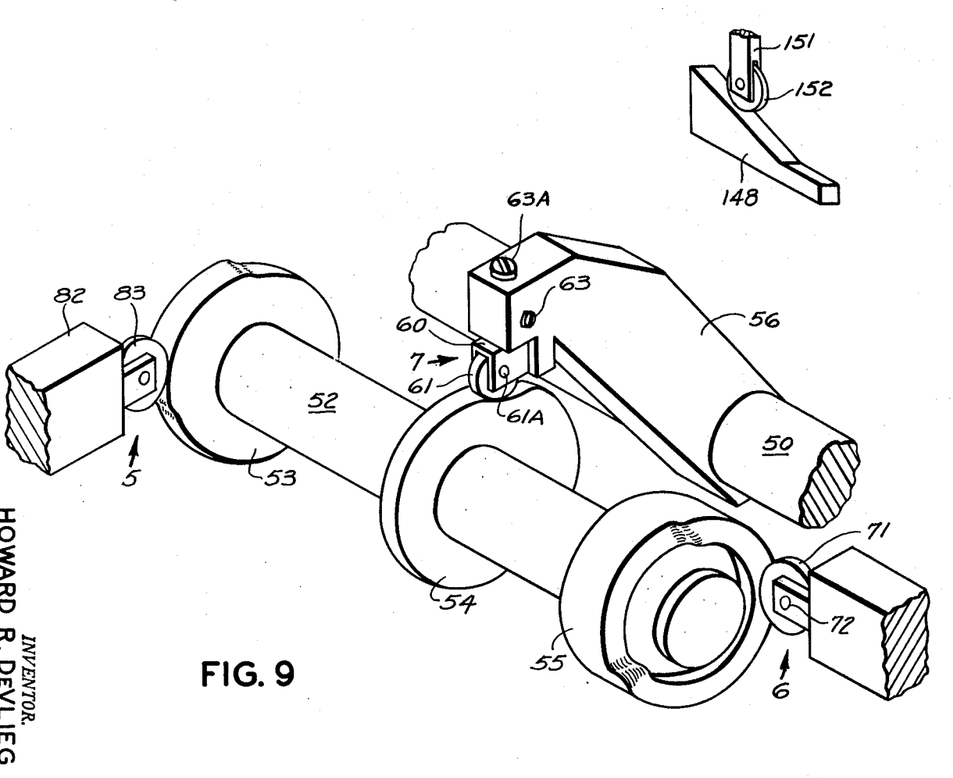
FIGURE 9 is a fragmentary perspective view illustrating the cam controlled movements of the work spindle and the cam shaft.
Figure 10:
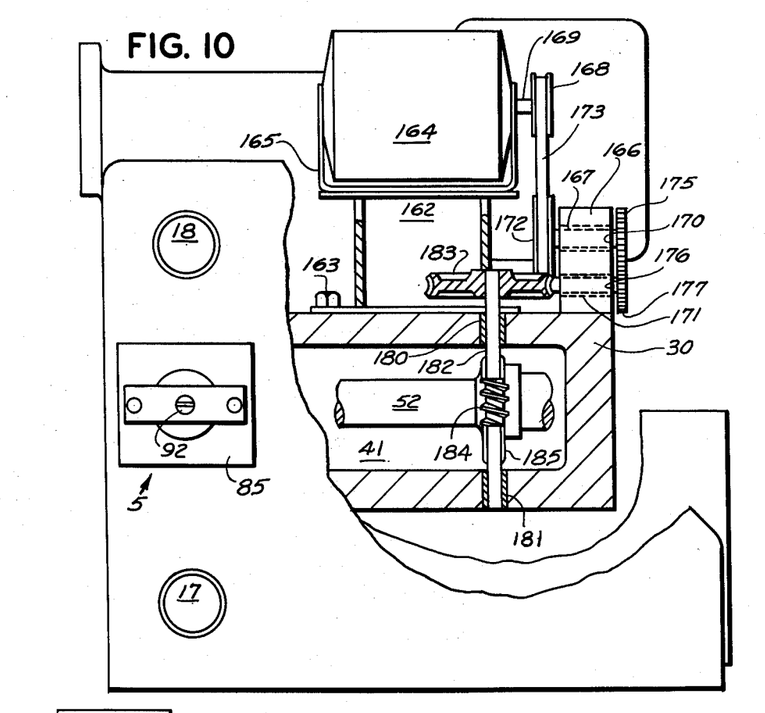
FIGURE 10 is a view partly in cross section taken along line 10—10 of FIGURE 4.
Figure 11:
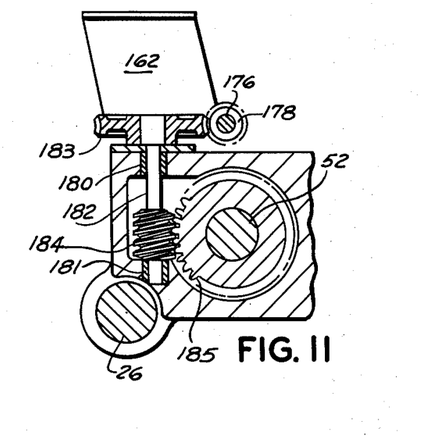
FIGURE 11 is a fragmentary cross sectional view taken along line 11—11 of FIGURE 3 with the motor removed.
Figures 12, 13, 14:
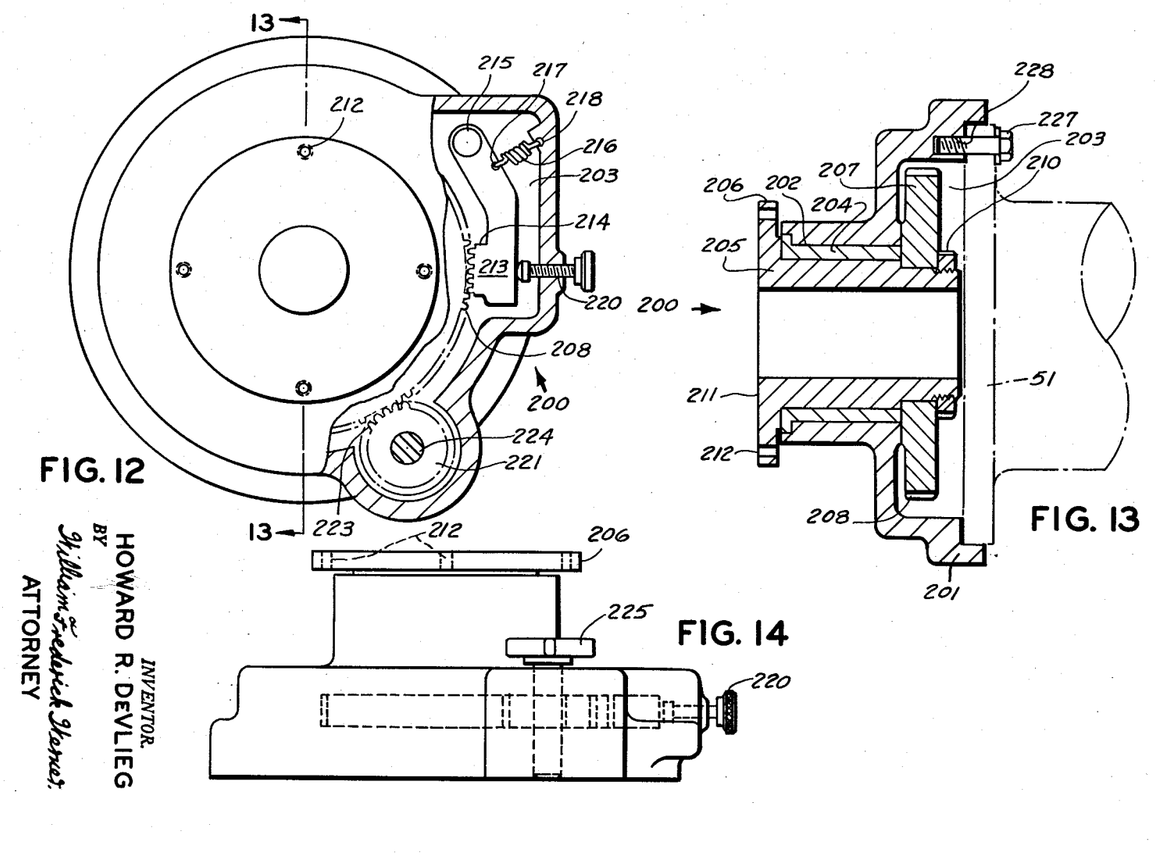
FIGURE 12 is a front elevational view, with a section broken away to show drive pinion and locking rack, of the indexing mechanism.
FIGURE 13 is a transverse cross sectional view taken along line 13—13 of FIGURE 12.
FIGURE 14 is a plan view of FIGURE 12.

A work spindle 50 provided with a face plate 51 is rotatively mounted in bearings 42, 43. A cam shaft 52 provided with threaded areas on both ends is rotatively mounted in bearings 44, 45. A side motion cam 53 (see FIGURES 5 and 9) having a contour to provide coordinated lateral movement is fixed to the front end of cam shaft 52 by means of a lock washer 53A and a lock nut 53B. An oscillating motion cam 54 is fixed to cam shaft 52. A longitudinal motion cam 55 is fixed to the back of end of cam shaft 52 by means of a lock nut 55A.

A cam follower generally indicated by reference numeral 7, consisting of an arm 56 secured to work spindle 50 by means of a pin 57 is provided with a bore 58 having a threaded area 59. A bifurcated lever 60 having a shank 62 is adjustably held in bore 60 by means of a set screw 63 and a threaded stud 63A. A roller 61 is rotatively mounted in the bifurcation of lever 60 by means of a pin 61A.

A spring 64 is fixed on opposite ends to arm 56 and right side wall 22 to yieldingly hold roller 61 against oscillating motion cam 54 which oscillates or rocks work spindle 50 back and forth in timed relation to the rotation of cam shaft 52.

A cam follower generally indicated by reference numeral 6, consisting of a bracket 65 secured on opposite sides to right side wall 22 and left side wall 21 to form part of the saddle 10 is provided with a hub 66 having a threaded bore 67. An externally threaded stud 68 provided with a bifurcated end is adjustably secured in threaded bore 67. A washer 69A abuts the end of hub 66. A stud 69 passes through washer 69 and threadedly engages stud 68 to hold stud 68 in adjusted position. An adjusting nut 70 is rotatively mounted on stud 68. A roller 71 is rotatively mounted in the bifurcated end of roller bracket 68 by means of pintle 72. Roller 71 bears against the face of longitudinal motion cam 55 so that as cam shaft 52 rotates, spindle housing 30, in which cam shaft 52 is rotatively mounted, will slide longitudinally along shafts 26 and 27 in relation to the saddle 10 and housing 9. A boss 73 is integrally formed on bracket 65. A threaded rod 74 provided with a head 75 is slidably mounted in boss 73 and is threadedly secured in spindle housing 30 at 73A. A spring 77 is interposed between head 75 and boss 73 to yieldingly urge boss 73 and therefore bracket 65 and roller 71 against the face of longitudinal motion cam 55.

Figure 7:
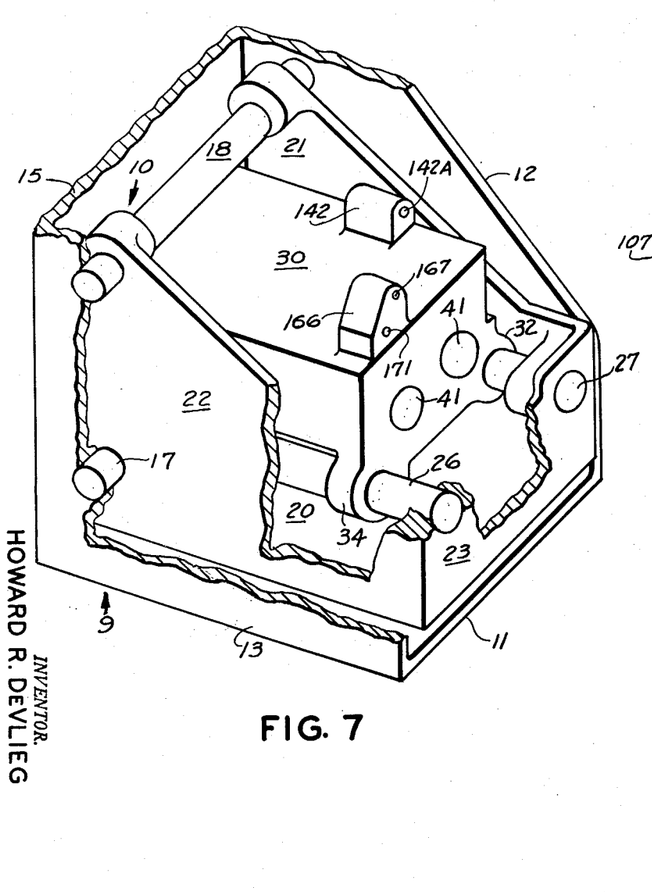
FIGURE 7 is a fragmentary perspective view partly in section showing the block support in the saddle and the saddle supported in the housing.
Figure 8:
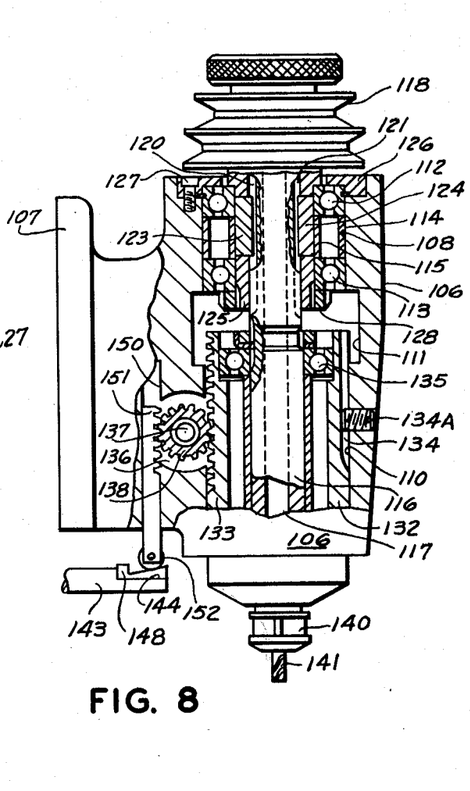
FIGURE 8 is a side elevational view partly in section of the cutter spindle head.

A third cam follower generally indicated by reference numeral 5, is provided for side motion cam 53. A boss 80 provided with an axial bearing 81 is integrally formed in spindle housing 30. A stud 82 having a bifurcated end is slidably mounted in axial bearing 81. A roller 83 is rotatively mounted in the bifurcated end of stud 82 and engages side motion cam 53. A bushing 84 having an axial thread is secured in right side wall 13 of housing 9 by means of screws 85. A bridge 86 is fixed to bushing 84 by means of screws 87. A threaded stud 88 is adjustably mounted in the axial threads of bushing 84. One end of stud 88 is slotted to receive a roller 89 rotatively mounted therein by means of a pin 90. Roller 89 abuts the end of stud 82. An adjusting nut 91 is rotatively mounted upon stud 88 and abuts the end of bushing 84. A set screw 92 rotatively mounted in bridge 86 abuts the end of stud 88. A threaded rod 93 fixed in right side wall 22 of saddle 10 passes through a clearance orifice 94 in right side 13 and is provided with an enlarged head 95. A spring 96 is interposed between right side 13 and head 95 to yieldingly urge the right side wall 22 of saddle 10 toward right side 13 of housing 9, thereby, yieldingly urging stud 82 through roller 83 against side motion cam 53 through roller 89 and stud 88 because shafts 26, 27 unite spindle frame 30 to saddle 10 for lateral direction (see FIGURE 7) movement.

An adjustable motor mount is provided consisting of a plate 102 and threaded member 103 which is adjustably secured to the internal threads of cylinder 19. A lock washer 104 locks threaded member 103 in adjusted position. An electric motor 100 provided with a mounting bracket 101 is secured to plate 102.

Cylinder 19 is provided with a spindle mounting plate 105. A spindle head 106 having an attaching plate 107 is adjustably secured to spindle mounting plate 105. Attaching plate 107 is provided with a plurality of threaded areas 107A, 107B. Spindle mounting plate 105 is provided with radial elongated slots 105A, 105B. Bolts 109A, 109B adjustably secure attaching plate 107 to spindle mounting plate 105 through radial elongated slots 105A, 105B and threaded areas 107A, 107B, respectively. Spindle head 106 is provided with a vertical bore consisting of an upper bearing seat 108, a lower bearing seat 110 and a clearance core 111. Upper 112 and a lower 113 anti-friction bearings separated by spacing collars 114, 115 are fixed in upper bearing seat 108. A spindle 116 having a hollow axial core 117 is provided with two key ways 120 and 121. A V belt driven pulley 118 provided with two keys 123 and 124 is rotatively mounted in anti-friction bearings 112 and 113 with keys 123, 124 engaging key ways 120, 121 respectively, to drive spindle 116 while permitting spindle 116 to move up and down in relation to pulley 118. A retaining collar 126 secured to spindle head 106 by means of screws 127 and a lock nut 128, retain and support anti-friction bearings 112, 113 and V belt driven pulley 118 in upper bearing seat 108. A V belt 129 connects V belt driven pulley 118 with a V belt drive pulley 130 fixed to the shaft 131 of motor 100.

A quill 132 provided with rack teeth 133 and a keyway 134 is slidably mounted in lower bearing seat 110. Set screw 134A rotatively mounted in spindle head 106 functions as the key for keyway 134. An anti-friction bearing 135 rotatively supports spindle 116 in quill 132. A transverse bore 136 is located in spindle head 106 adjacent and in communication with the vertical bore. A shaft 137 located in bore 136 is rotatively mounted in spindle head 106. A pinion gear 138 fixed on one end of shaft 137 engages rack teeth 133. A knob 139 is fixed to the other end of shaft 137 so that manual turning of knob 139 will raise and lower spindle 116. A chuck 140 provided with a rotating cutting tool 141 is fixed to one end of spindle 116.

A pad 142 integrally formed in the top of spindle housing 30 is provided with an axial orifice 142A. A rod 143 having a cam seat 144 in one end and a threaded tail 145 on the other end, is adjustably secured in axial orifice 142A and to pad 142 by means of nuts 146 and 147. Rod 143 is slidably mounted in front wall 24 of saddle 10. A cam 148 is fixed in cam seat 144. A vertical guide way 150 is provided in spindle housing 106 adjacent and in communication with transverse bore 136. A second rack 151 having teeth which engage pinion gear 138 is provided with a cam follower 152 and is slidably mounted in vertical guide way 150. The longitudinal movement of spindle housing 30 causes cam 148 to actuate cam follower 152, hence second rack 151 which, through pinion gear 138, rack teeth 133 and quill 132, raises and lowers spindle 116 toward and away from the work piece as will presently appear.

A motor bracket 162 is fixed to spindle housing 30 by means of bolts 163. A motor 164 provided with a motor mount 165 and a rotating shaft 169 is fixed to motor bracket 162. A boss 166 provided with axial bearings 167, 171 forms an integral part of spindle housing 30. A shaft 170 provided with a pulley 172 fixed to one end a gear 175 on the other end is rotatively mounted in axial bearing 167. A pulley 168 is fixed to shaft 169. A belt 173 rotatively connects pulley 172 with pulley 168. A shaft 176 rotatively mounted in bearing 171 is provided with a gear 177 fixed to one end and a worm 178 fixed to the other end. Gear 177 engages and is driven by gear 175.

Spindle housing 30 is provided with vertically aligned bushings 180 and 181. A shaft 182 having a worm wheel 183 fixed to its outboard end is provided with a worm 184 located within bore 41. Shaft 182 is rotatively mounted in bushings 180 and 181. Worm wheel 183 engages and is driven by worm 178.

A worm wheel 185 is fixed to shaft 52. Worm 184 engages to drive worm wheel 185 and shaft 52.

An indexing fixture is utilized to give incremental rotation to a work piece. The indexing fixture, generally indicated by reference numeral 200, consists of a housing 201 having a stepped axial bore consisting of a core 202 and a chamber 203. A bushing 204 is secured in core 202. A hollow shaft 205 provided with a flange 206 is rotatively mounted in bushing 204. An index plate 207 provided with teeth 208 is fixed to hollow shaft 205. A nut 210 threadedly secured to the end of hollow shaft 205 secures index plate 207 to hollow shaft 205. Hollow shaft 205 is provided with a work holding face 211 having bolt holes 212 for securing a work piece thereto. A locking rack 213 provided with teeth 214 is pivotally mounted to housing 201 on a stud 215 and is located in chamber 203. A spring 216 connected on opposite ends to locking rack 213 at 217 and to housing 201 at 218 yieldingly urges teeth 214 away from engagement with teeth 208. A stud 220 rotatively threaded in housing 201 opposes the force of spring 216 to force teeth 214 into engagement with teeth 208. A drive pinion 221 provided with teeth 223 is rotatively mounted upon a shaft 224 fixed in housing 201. Pinion 221 is located in chamber 203 with teeth 223 engaging teeth 208. A knob 225 is fixed to the end of shaft 224 which projects outside of housing 201. Knob 225 is provided for manual operation of shaft 224 and therefore for the manual turning of indexing plate 207. It is contemplated that knob 225 could be replaced with a pinion gear for attachment to an automatic means for turning indexing plate 207. Indexing fixture 200 is secured to face plate 51 by means of bolts 227 which pass through clearance orifices in face plate 51 and engaged tapped holes 228 located in housing 201.

In operation a work piece may be secured to work holding face 211 by means of clamps (not shown) or by means of bolts securable in bolt holes 212. The contour to be cut by rotating cutter 141 will be generated as cams 53, 54, 55 and 148 move face plate 51 and indexing fixture 200 through lateral, oscillating and longitudinal motions in timed relation to the up and down movement of cutter 141.

Motor 164 through pulley 168, belt 173 and pulley 172 will rotate shaft 170, gears 175, 177 and shaft 176, whereby worm 178 will rotate worm wheel 183, shaft 182 and worm 184 to drive shaft 52 through worm wheel 185.

Rotation of shaft 52 will cause side motion cam 53 to rotate against the tension of spring 96 exerted through cam follower 5, and thereby move saddle 10 laterally along guide bars 17, 18 in relation to frame 9. Simultaneously, oscillating motion cam 54, fixed to rotating shaft 52, will actuate cam follower 7, against the tension of spring 64, to cause work spindle 50 to oscillate or rock back and forth. And, longitudinal motion cam 55 fixed to rotating shaft 52, will rotate against the tension of spring 77 forming part of cam follower 6 to cause spindle housing 30 to move longitudinally along shafts 26, 27 in relation to frame 9. Thus, work spindle 50 mounted in spindle housing 30 for rotation or oscillation will also move longitudinally and laterally in relation to frame 9 and spindle head 106 provided with rotating cutter 141. As spindle housing 30 slides back and forth in a longitudinal direction along shafts 26 and 27, pad 142 to which rod 143 is fixed, will cause rod 143 and cam 148 to move back and forth, thereby moving second rack 151, pinion gear 138 and rack teeth 133 on quill 132 up and down to impart up and down movement to rotating cutter 141. Thus coordinated movement between a rotating cutter 141 and a work carrying spindle 50 is provided.

It becomes obvious that all of the movements provided for may not be desired at one time. For example, rotating cutter 141 may be held in a fixed position during the cutting operation. Rod 143 is easily removed from pad 142 by removal of nut 147 from threads 145. Or, it may be desired to eliminate side motion cam 53 and the accompanying lateral shifting of saddle 10. This condition may prevail when a form cutter is placed in chuck 140. Assume the teeth for a spur gear are to be cut. A cylindrical work blank would be secured to work holding face 211. Longitudinal or feed cam 55 would be employed to feed the blank the width of a spur gear tooth. After each tooth was cut, stud 220 would be retracted to allow locking rack 213 under the influence of spring 216 to pivot on stud 215 until teeth 214 disengage teeth 208. Knob 225 would be manually rotated one increment as measured by teeth 223, thereby rotating work holding plate 211. Stud 220 would be rotated in a reverse direction to force teeth 214 into engagement with teeth 208 against the tension of spring 216 to lock work holding plate 211 in indexed position ready for the cutting of the adjacent tooth.

Under other circumstances any one or combination of two of the cams 53, 54 or 55 may be utilized to provide a motion or combination of motions to work spindle 50. It is also contemplated to replace cam follower 7 and cam 54 with a set of gears, whereby work spindle 50 may be rotated in timed relation with cam shaft 52. Then in conjunction with longitudinal or feed cam 55 a helix could be cut in a work piece secured to face plate 51 or work holding plate 211. If work holding plate 211 is used then a series of parallel helixes could be cut by rotating cutter 141 because of the indexing motion given work holding plate 211. If rotating cutter 141 was raised and lowered due to cam 148 a tapered helix would be cut.

If the combination of cams 53 and 55 are used, then cam 53 may be considered coordinate "X" and cam 55 coordinate "Y." Raised letters could be cut in a work piece because both lateral and longitudinal motion would be imparted to face plate 51 in relation to rotating cutter 141 held in a fixed position in relation to face plate 51.

It is obvious that any cam singularly or in combination of the four cams 53, 54, 55 and 148 can be selected in conjunction with or without indexing mechanism 200.

In order to make the claims easily understood and to remove any ambiguity in understanding the claims, the term "second cam follower" refers to cam follower 6 and the term "third cam follower" refers to cam follower 5.

Having shown and described a preferred embodiment of the present invention, by way of example, it should be realized that structural changes could be made and other examples given without departing from either the spirit or scope of this invention.

What I claim is:

1. In a machine tool, a frame, a saddle, guide bar means to slidably mount said saddle in said frame, a spindle housing, shaft means located at right angles to said guide bar means, slidably mounting said spindle housing in said saddle, a cam shaft rotatively mounted in said spindle housing, means to rotate said cam shaft three hundred sixty degrees, a work holder fixed to said spindle housing, cam means operable on said cam shaft to impart longitudinal movement to said spindle housing relative to said saddle and said frame, and to impart lateral movement to said saddle and spindle housing relative to said frame upon rotation of said cam shaft, and a rotatable spindle provided with a cutter, and means to move said cutter toward and away from said work holder whereby a work piece held on said work holder moves through a contour pattern generated by said longitudinal and lateral movement of said work holder fixed to said spindle housing around said cutter in timed relation ot the movement of the cutter toward and away from the work piece and work holder.

2. In a machine tool, a frame, a saddle, guide bar means mounting said saddle in said frame, a spindle housing, shaft means located at right angles to said guide bar means slidably mounting said spindle housing in said saddle, a cam shaft, provided with a feed cam and an oscillating cam rotatively mounted in said spindle housing, a work spindle, having a work holder, mounted for oscillating movement in said spindle housing, a cam follower fixed to said work spindle, resilient means urging said cam follower against said oscillating cam whereby rotation of said cam shaft through a cycle of three hundred sixty degrees imparts oscillating movement to said work spindle, a second cam follower fixed to said saddle, resilient means urging said second cam follower against said feed cam whereby rotation of said cam shaft imparts relative longitudinal movement between said spindle housing and said saddle, and cutting means fixed to said frame whereby a work piece held on said work holder moves through a contour pattern generated by longitudinal and oscillating motion around said cutting means.

3. In a machine tool, a frame, a saddle, guide bar means mounting said saddle in said frame, a spindle housing, shaft means located at right angles to said guide bar means slidably mounting said spindle housing in said saddle, a cam shaft, provided with a feed cam and an oscillating cam, rotatively mounted in said spindle housing, a work spindle, having a work holder mounted for oscillating movement in said spindle housing, a cam follower fixed to said work spindle, resilient means urging said cam follower against said oscillating cam whereby rotation of said cam shaft imparts oscillating movement to said work spindle, a second cam follower fixed to said saddle, resilient means urging said second cam follower against said feed cam whereby rotation of said cam shaft through a cycle of three hundred sixty degrees imparts relative longitudinal movement between said spindle housing and said saddle, and a spindle head secured to said frame, a rotatable spindle having a cutter rotatively mounted in said spindle head, said rotatable spindle movable into and out of said spindle head, and means to move said rotatable spindle into and out of said spindle head whereby a work piece held on said work holder moves through a contour pattern generated by longitudinal and oscillating motion around said cutter in timed relation with the in and out movement of the rotatable spindle having the cutter.

4. In a machine tool, a frame, a saddle, guide bar means slidably mounting said saddle in said frame, a spindle housing, shaft means located at right angles to said guide bar means slidably mounting said spindle housing in said saddle, a cam shaft, provided with a side motion cam, a work spindle control cam and a feed cam, rotatively mounted in said spindle housing, means to rotate said cam shaft three hundred sixty degrees, a work spindle, having a work holder, mounted for rotational movement in said spindle housing, a cam follower fixed to said work spindle, resilient means urging said cam follower against said work spindle control cam whereby rotation of said cam shaft imparts rotation to said work spindle, a second cam follower fixed to said saddle, resilient means urging said second cam follower against said feed cam whereby rotation of said cam shaft imparts relative longitudinal movement between said spindle housing and said saddle, a third cam follower fixed to said frame, resilient means urging said third cam follower against said side motion cam whereby rotation of cam shaft imparts relative lateral movement between said frame and said saddle, and cutting means adjustably secured to said frame for movement toward and away from said work holder whereby a work piece held on said work holder moves through a contour pattern generated by the lateral, longitudinal and rotational movements of the work holder in timed relation to the movement of the cutting means toward and away from the work piece.

5. In a machine tool, a housing having two horizontally parallel guide bars in vertical alignment, a saddle slidably mounted upon said two horizontally parallel guide bars, two horizontally parallel shafts in horizontal alignment fixed in said saddle, a spindle housing slidably mounted upon said two horizontally parallel shafts, a cam shaft, provided with a side motion cam, a work spindle control cam and a feed cam rotatively mounted in said spindle housing, means to rotate said cam shaft through a cycle of three hundred sixty degrees, a work spindle, having a work holder, mounted for rotational movement in said spindle housing, a cam follower fixed to said work spindle, resilient means urging said cam follower against said work spindle control cam whereby rotation of said cam shaft imparts rotational movement to said work spindle, a second cam follower fixed to said saddle, a second resilient means, connecting said spindle housing with said saddle, urging said second cam follower against said feed cam whereby rotation of said cam shaft causes said spindle housing to slide longitudinally upon said two horizontal parallel shafts against the tension of said second resilient means, a third cam follower fixed to said housing, a third resilient means connecting said housing with said saddle, urging said third cam follower against said side motion cam whereby rotation of said cam shaft causes said saddle to slide laterally upon said two horizontally parallel guide bars against the tension of said third resilient means, and a rotatable spindle secured to said housing, means to reciprocate said rotatable spindle toward and away from said work holder whereby a work piece held on said work holder moves through a contour pattern generated by the lateral, longitudinal and rotational movement of said work holder in timed relation to the movement of the rotatable spindle toward and away from the work piece.

6. In a machine tool, a housing comprising a base having a left side and a right side, a plurality of guide bars fixed in said left side and said right side, a saddle slidably mounted upon said plurality of guide bars, a plurality of shafts fixed in said saddle at right angle to said plurality of guide bars, a spindle housing slidably mounted upon said plurality of shafts, a cam shaft, provided with a side motion cam, an oscillating cam and a feed cam, rotatively mounted in said spindle housing, means to rotate said cam shaft through a cycle of three hundred sixty degrees, a work spindle, having a work holder, mounted for oscillating movement in said spindle housing, a cam follower fixed to said work spindle, resilient means urging said cam follower against said oscillating cam, whereby rotation of said cam shaft imparts oscillating movement to said work spindle, a second cam follower fixed to said saddle, a second resilient means, connecting said spindle housing with said saddle, urging said second cam follower against said feed cam whereby rotation of said cam shaft causes said spindle housing to slide longitudinally upon said plurality of shafts against the tension of said second resilient means, a third cam follower fixed to said housing, a third resilient means connecting said housing with said saddle, urging said third cam follower against said side motion cam whereby rotation of said cam shaft causes said saddle to slide laterally upon said plurality of guide bars against the tension of said third resilient means, and a second spindle housing secured in angular adjustable position to said housing, a cutting tool carrying spindle rotatively mounted in said spindle housing, means to rotate said spindle, and cam means actuating said spindle in reation to the rotation of said cam shaft toward and away from said work holder whereby a work piece fixed to said work holder moves through a contour pattern generated by the lateral, longitudinal and rotational movement of said work holder in timed relation to the movement of the rotatable spindle toward and away from the work holder and work piece and indexing means to index said work spindle in timed sequence with the rotation of said cam shaft.

7. In a machine tool, a housing comprising a base having upright left and right sides, two parallel guide bars fixed on opposite ends in said left and right sides, respectively, a saddle comprising a base having upright left and right side walls substantially parallel to said left and right sides respectively, a rear wall and a front wall, two parallel shafts fixed on opposite ends in said front wall and rear wall approximately at right angles to said left and right side walls, said saddle slidably mounted upon two parallel guide bars, a spindle housing slidably mounted upon said two parallel shafts, a cam shaft, provided with a side motion cam, an oscillating cam and a feed cam, rotatively mounted in said spindle housing, an electric motor secured to said spindle housing, drive means connecting said electric motor with said cam shaft to rotate said cam shaft, a work spindle, having a work holder, indexing means having means to hold a work piece attached to said work holder to index a work piece, said work spindle mounted for oscillating movement in said spindle housing, a cam follower fixed to said work spindle, spring means, urging said cam follower against said oscillating cam whereby rotation of said cam shaft imparts oscillating movement to said work spindle, a second cam follower fixed to said saddle, a second spring means connecting said spindle housing with said saddle, urging said second cam follower against said feed cam whereby rotation of said cam shaft causes said spindle housing to slide longitudinally upon said plurality of shafts against the tension of said second spring means, a third cam follower fixed to said housing, a third spring means connecting said housing with said saddle, urging said third cam follower against said side motion cam whereby rotation of said cam shaft causes said saddle to slide laterally upon said two parallel guide bars against the tension of said third spring means, and a second spindle housing secured in adjustable position to said housing, a cutting tool, a spindle rotatively mounted in said second spindle housing and having means to secure said cutting tool therein, a second electric motor secured to said housing, drive means connecting said second electric motor with said spindle to rotate said spindle and cutting tool, and cam means fixed to said spindle housing, a cam follower fixed to said rotating spindle engaging said cam means whereby longitudinal movement of said first mentioned spindle housing imparts up and down movement to said rotating spindle and cutting tool, whereby a work piece fixed to said indexing means moves through a contour pattern generated by the lateral, longitudinal, oscillating movements of said indexing means around said cutting tool in timed relation to the up and down movement of said cutting tool.

8. In a machine tool, a housing, a saddle fixed to said housing and provided with two longitudinal shafts, a spindle housing having longitudinal bearings slidably mounted upon said two longitudinal shafts, a cam shaft, provided with a feed cam and a work spindle control cam, rotatively mounted in said spindle housing, a work spindle, having a work holder, mounted for rotational movement in said spindle housing, a cam follower fixed to said work spindle, spring means fixed on opposite ends to said cam follower and to said saddle, respectively, urging said cam follower against said work spindle control cam whereby rotation of said cam shaft imparts rotational movement to said work spindle, a second cam follower fixed to said saddle, spring means between said spindle housing and said saddle to yieldingly unite said spindle housing and said saddle and to yieldingly urge said second cam follower against said feed cam whereby rotation of said cam shaft imparts relative forward longitudinal movement of said spindle housing in relation to said saddle along said two longitudinal shafts against the tension of said spring means, and a second spindle housing having a rotatable cutter holding spindle secured in fixed position to said housing, a cutter fixed in said spindle, means to rotate said rotatable cutter holding spindle whereby a work piece held on said work holder and against said cutter moves through a contour pattern generated by the feed cam and work spindle control cam in relation to the fixed position of the rotating cutter holding spindle.

9. In a machine tool, a frame, a saddle, guide bar means slidably mounting said saddle in said frame, a spindle housing, shaft means located at approximate right angles to said guide bar means slidably mounting said spindle housing in said saddle, a cam shaft, provided with a side motion cam and a longitudinal motion cam, rotatively mounted in said spindle housing, means rotating said cam shaft three hundred and sixty degrees, and thereby slide said spindle housing longitudinally relative to said saddle by means of said longitudinal motion cam and slide said saddle and said spindle housing laterally relative to said frame by means of said side motion cam, a work holder fixed to said spindle housing, and a rotatable spindle provided with a cutter fixed to said frame whereby a work piece fixed to said work holder moves through a contour pattern, around said cutter, generated by said longitudinal and lateral movement of said work holder fixed to said spindle housing.

References Cited in the file of this patent
UNITED STATES PATENTS

| | | |
|---|---|---|
| 782,240 | Hanson | Feb. 14, 1905 |
| 2,086,915 | Kopp | July 13, 1937 |
| 2,317,411 | Seyferth | Apr. 27, 1943 |
| 2,660,930 | De Vlieg et al. | Dec. 1, 1953 |
| 2,872,853 | Hoern | Feb. 10, 1959 |

FOREIGN PATENTS

| | | |
|---|---|---|
| 965,092 | France | Feb. 8, 1950 |